Dec. 7, 1954     E. E. RUSH     2,696,307
CONTINUOUS CENTRIFUGAL CRYSTAL PURIFIER
Filed Aug. 13, 1951
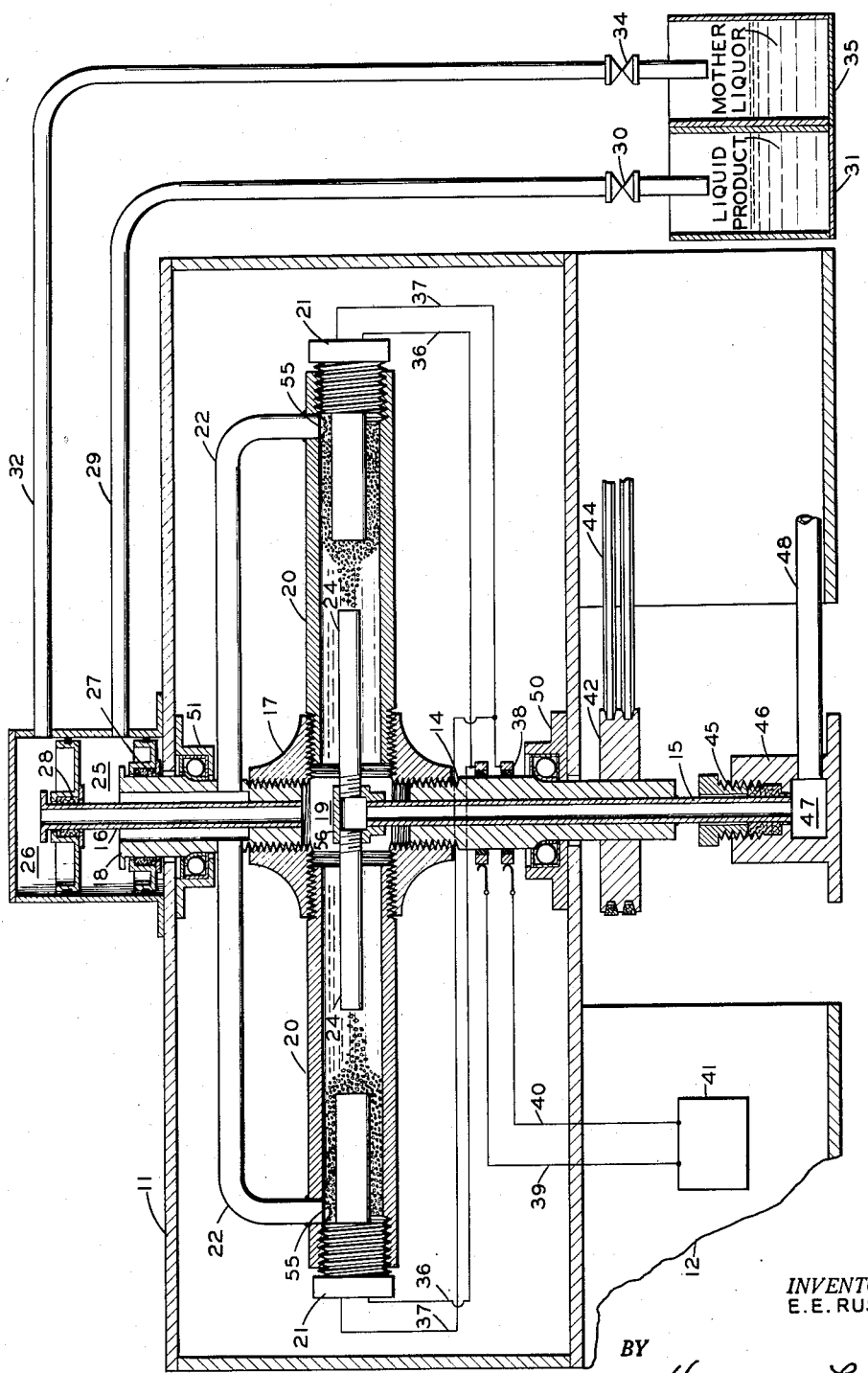
INVENTOR.
E. E. RUSH
BY
*Hudson & Young*
ATTORNEYS United States Patent Office 2,696,307
Patented Dec. 7, 1954

2,696,307

CONTINUOUS CENTRIFUGAL CRYSTAL PURIFIER

Elton E. Rush, Bartlesville, Okla., assignor to Phillips Petroleum Company, a corporation of Delaware Application August 13, 1951, Serial No. 241,594

8 Claims. (Cl. 210—63)

This invention relates to crystal purifiers. In one of its more specific aspects this invention relates to an apparatus for the continuous centrifugal purification of crystals.

In the purification of various materials, particularly organic compounds, by crystallization methods some compounds can be obtained in a relatively pure form by a single crystallization from a mixture of compounds. In other cases, the desired component cannot be recovered directly in a substantially pure form because that particular component with some others which may be present in a mixture forms mixed crystals or solid solutions. However, by carrying out a series of crystallization steps a substantially pure compound can be separated therefrom, much like the separation of compounds by distillation.

Many chemical compounds, particularly isomers, have similar boiling points and solubilities and can be separated only by crystallization. As indicated hereinbefore crystallization when applied to certain systems has one great advantage over other methods, such as distillation and solvent extraction, in that it is the only separation method which in certain cases theoretically offers a pure product in the single stage of operation. Crystallization may be employed to separate many chemical compounds and isomers which can be separated by no other means and may also be employed to purify many compounds which cannot economically be purified by other means. However, despite the fact that one stage of crystallization in certain cases theoretically yields a pure product, attainment of this ideal has been difficult. Complete removal of liquid, occluded impurities without loss in yield is required and is to be desired. Crystals which are formed and recovered from a crystallization step retain in many cases 50 per cent by weight occluded liquid impurities. Many techniques have been suggested to remove the occluded mother liquor from the crystal in order to obtain pure crystals. However, none heretofore have been completely satisfactory.

It is therefore an object of this invention to provide an apparatus for the purification of crystals formed during a crystallization step. It is another object of this invention to provide an apparatus for obtaining high yields of high purity crystals. It is still another object of this invention to provide an apparatus which may be employed in the continuous purification of crystals.

The foregoing and other objects and advantages will become apparent in view of the accompanying description taken in combination with the accompanying drawing wherein a sectional, elevational view of an apparatus useful for the continuous purification of crystals is shown.

Referring now to the drawing, an outer shell or housing is shown at 11, supported on a suitable frame 12. Located within the interior of housing 11 and extending therein in an upright, preferably vertical position is shaft 14. Shaft 14 attached to cross 17 contains a conduit 15 extending therethrough. Conduits 16 and 18 are preferably concentrically disposed and conduit 16 communicates with chamber 19 within cross 17. Conduit 16 extends beyond and above conduit 18. Extending outwardly from chamber 19 and perpendicular to the axis of shaft 14 is a plurality of tubes 20 which are closed at their outer ends preferably by electrical heating means 21. Located in the outer end portion of tubes 20 are conduits 22 which communicate with outer ends of tubes 20 and conduit 18, i. e. the annular space between conduits 18 and 16. Crystal slurry distributing tubes 24 are located within, preferably concentrically, each of said tubes 20 and extend part of the way thereinto and are fixed to and in communication with conduit 15 via T 56. Suitably located in the top portion of shell 11 are receiving chambers 25 and 26. Receiving chamber 25 communicates with conduit 18 and conduit 18 is free to rotate therein by means of gland 27. Extending through chamber 25 into chamber 26 which may be suitably positioned on top of chamber 25 is conduit 16. Gland 28 allows rotation of conduit 16 within chamber 26 and at the same time prevents leakage of recovered mother liquor and reflux liquid from chamber 26 into chamber 25. A liquid product conduit 29 containing valve 30 leads from chamber 25 to liquid product receiver 31. Similarly conduit 32 having valve means 34 provided therein leads from chamber 26 to mother liquor container 35.

Heating means 21, suitably shown in the drawing as electrical heating means, are supplied with current and voltage via conductors 36 and 37 which contact a commutating device 38 which is supplied with current and voltage via conductors 39 and 40 from a suitable voltage source 41 such as a transformer or power line or similar device.

Fastened to the lower section of shaft 14 is drive sheave 42 which may be driven by suitable drive means such as V-belts 44 which in turn may be driven and turned by a suitable power source or motor not shown. Conduit 15 is shown extending from the bottom section of shaft 14 into packing gland assembly 45 supported in a suitable bearing or guide 46. Located within guide 46 is chamber 47 which communicates directly with conduit 15 and with crystal slurry conduit 48 through which the crystal slurry feed to this apparatus enters. Also shown are suitable bearing supports 50 and 51 attached to shell 11 as guides and supports. If desired the whole apparatus can be inverted and the crystal slurry fed from the top.

Referring again to the accompanying drawing, in operation a crystal slurry enters conduit 48 and passes up through shaft 14 via conduit 15 and then through tubes 24 into tubes 20. At the same time shaft 14 is rapidly rotated between about 100 to 1800 R. P. M. together with tubes 20 and conduits 16 and 18 associated therewith. Due to the rapid rotation of the shaft 14 and tubes 20, the crystals as they enter tube 20 are thrown out toward the outer ends of tube 20 and a pile of crystals will rapidly build up at the outer ends of tubes 20. At the same time, as the crystals build up at the outer ends of tube 20 heat is applied to these crystals by heating means 21 and the crystals are caused to melt and a portion of the resulting product liquid flows through conduit 22 into conduit 18 and then into chamber 25. At the same time, the remaining portion of the resulting product liquid from the melting crystals refluxes back through the crystals in the direction of shaft 14. A slurry of crystals is constantly fed into the apparatus via conduit 48. At the same time mother liquor containing some liquid crystal product which refluxed and thereby washed the occluded mother liquor from the crystals in tube 20, passes out into chamber 19 and then from conduit 16 into chamber 26. If the resulting product liquid from the molten crystals is of a lesser density than the mother liquor, there will be a tendency for the liquid to flow out of tubes 20 via chamber 19 and conduit 16. However, this flow can be restricted and controlled by valve 34 so that only mother liquor slightly enriched with a small portion of reflux liquid is taken off from tubes 20 via conduit 16. The product liquid resulting from the crystals, flows from tubes 20 via conduits 22, 18 and 29. Restricting the flow of mother liquor (in this instance the more dense liquid) by throttling back on valve 34 creates a back pressure so that as the crystal slurry feed is continuously supplied to the apparatus the liquid resulting from molten crystals moves via conduits 22, 18, chamber 25 and conduit 29 into receiver 31 and the mother liquor moves via chamber 19, conduit 16, chamber 26, and conduit 32 through throttling valve 34 into receiver 35. If desired or required, screens 55 may be inserted at those positions where conduits 22 join tubes 20 in order to prevent the escape of crystals directly into conduits 22.

Similarly, if the liquid resulting from the melting of the crystals in tube 20 is more dense than the mother liquor, there will be a tendency for the liquid to flow through conduits 22 and 18 to chamber 25. This flow tendency can be restricted and controlled in the same fashion as indicated above by throttling the recovery of the liquid taken from chamber 25 by means of valve 30 which is inserted in conduit 29. Accordingly, in operation, a suitable separation of the various liquid streams i. e. mother liquor and the resulting liquid produced by the melting crystals, can be accomplished by throttling valves 30 or 34. While the apparatus of this invention has been shown in the accompanying drawing as having two tubes 20, it is of course realized that there may be more than two such tubes extending radially from shaft 14 together with the necessary liquid conduits associated therewith and/or there may be a plurality of tubes 20 stacked one above the other and extending radially and perpendicularly with respect to shaft 14. Furthermore tubes 20 may be replaced by a rotating chamber or drum.

As another modification of the apparatus of this invention, a cooler or heat exchanger fitted with scraper blades may be located in the lower section of shaft 14 so as to obtain a crystal slurry therein rather than feeding a crystal slurry directly into the apparatus via conduit 48. As a further modification of this invention, a suitable valve such as a needle valve, can be installed in the uppermost portion of conduit 16 where it enters chamber 26 and glands 28 and 27 can be eliminated by employing slinger plates in place thereof. In operation this valve would take the place of valve 34 and similarly would serve to create sufficient back pressure to give a flow separation within the apparatus between the product liquid and the mother liquor in the manner indicated hereinbefore. It is of course realized that the apparatus of this invention is particularly useful for the continuous crystal purification of those crystals which are more dense then their mother liquor.

Illustrative of but not limiting the separations which may be carried out in the apparatus of this invention and indicative of the high crystal purity which can be obtained within the apparatus of this invention and the high yields to be obtained thereby, a liquid mixture of the following composition:

| Compound: | Mol per cent |
| --- | --- |
| 2,2-dimethylpentane | 1.1 |
| 2,4-dimethylpentane | 4.0 |
| Cyclohexane | 90.2 |
| 3,3-dimethylpentane | 0.7 |
| 1,1-dimethylcyclopentane | 1.2 |
| 2,3-dimethylpentane | 0.8 |
| 2-methylhexane | 2.0 | is cooled to about −100° F. and is fed to the apparatus of this invention. Cyclohexane is recovered at a purity of about 99.0 mol per cent and at a yield of about 69% by volume.

It will be understood of course that once those skilled in the art have been taught the theory and operation of this invention and the results obtained thereby, such results may be obtained by various modifications and rearrangements of parts other than those specifically set forth and enumerated herein. Hence, no attempt has been made to describe and set forth all the modifications which may be made without departing from the spirit or scope of this invention.

I claim:

1. A crystal purifier comprising a rotatably mounted upright shaft containing a first conduit rigidly affixed in the lower section thereof and rotatable therewith and a second and a third conduit concentrically and rigidly formed in the upper section thereof and rotatable therewith; a chamber within said shaft intermediate said lower and upper sections; a plurality of tubes closed at the outer ends rigidly connected to said chamber and perpendicular to the vertical axis of said shaft at said chamber, each tube being in communication with said second conduit via said chamber; heating means located at the outer ends of said tubes; liquid product conduits communicating with the outer end portion of each said tube and with said third conduit; a crystal slurry distributing tube located concentrically within each of said tubes and extending from said chamber part of the way thereinto and fixed to and in communication with said first conduit; and means to rotate said shaft.

2. An apparatus according to claim 1 wherein the heating means are electrical heating means.

3. A crystal purifier comprising a rotatably mounted upright shaft containing a first conduit rigidly affixed in the lower section thereof and rotatable therewith and a second and a third conduit concentrically and rigidly formed in the upper section thereof and rotatable therewith, said second conduit being disposed within said third conduit; a chamber within said shaft intermediate said lower and upper sections; a pair of tubes closed at the outer ends rigidly connected to said chamber and radially extending therefrom, each tube being in communication with said second conduit via said chamber; heating means located at the outer ends of said tubes; liquid product conduits communicating between the outer end portion of each said tube and said third conduit; a crystal slurry distributing conduit located within each of said tubes and extending from said chamber part of the way thereinto and fixed to and in communication with said first conduit and means to rotate said shaft.

4. A continuous crystal purifier comprising a rotatably mounted upright shaft containing a first conduit rigidly affixed in the lower section thereof and rotatable therewith and a second and a third conduit concentrically and rigidly formed in the upper section thereof and rotatable therewith, said second conduit being disposed within and extending above said third conduit; a chamber within said shaft intermediate said lower and upper sections; a plurality of tubes in pairs, closed at the outer ends, fixed in line on opposite sides of said shaft and perpendicular to the vertical axis of said shaft at said chamber, each tube being in communication with said second conduit via said chamber; heating means located at the outer ends of said tubes; liquid crystal product conduits communicating between the outer end portions of each said tube and said third conduit; a crystal slurry distributing tube located concentrically within each of said tubes and extending from said chamber part of the way thereinto and fixed to and in communication with said first conduit, a first liquid receiving chamber enclosing at least a portion of that part of said second conduit extending above said third conduit and adapted to receive liquid from said third conduit; a second liquid receiving chamber mounted above said first receiving chamber and adapted to receive liquid from said second conduit and means to rotate said shaft.

5. A continuous crystal purifier comprising a rotatably mounted vertical shaft containing a first conduit rigidly affixed in the lower section thereof and rotatable therewith and a second and a third conduit concentrically and rigidly formed in the upper section thereof and rotatable therewith, said second conduit being disposed within and extending above said third conduit; a chamber within said shaft intermediate said lower and upper sections; a plurality of tubes in pairs, closed at the outer ends, fixed in line and perpendicular to the vertical axis of said shaft at said chamber, each tube being in communication with said second conduit via said chamber; heating means located at the outer ends of said tubes, liquid crystal product conduits communicating the outer end portions of each said tube with said third conduit; a crystal slurry distributing tube located concentrically within each of said tubes and extending from said chamber part of the way thereinto and fixed to and in communication with said first conduit; a first liquid receiving chamber enclosing at least a portion of that part of said second conduit extending above said third conduit and adapted to receive liquid from said third conduit; a second liquid receiving chamber mounted above said first receiving chamber and adapted to receive liquid from said second conduit; a liquid product conduit leading from each of said receiving chambers, valve means associated with said liquid product conduits and means to rotate said shaft.

6. A process for purifying a crystalline chemical compound which comprises the steps of continuously centrifuging a slurry of said compound in a plurality of restricted melting zones; displacing liquid from the outer end portion of each said melting zones with crystals from said slurry; applying heat to the outer end portion of each said melting zones so as to melt said crystals therein; withdrawing a portion of resulting substantially pure liquid product from the outer end portion of said melting zone; refluxing a portion of said resulting substantially pure liquid product inwardly through said crystals; withdrawing mother liquor and reflux liquid from the inner end of each said melting zones; and balancing the withdrawal of liquid product and mother liquor-reflux liquid so as to assure constant reflux of substantially pure product through the crystals.

7. A crystal purifier comprising a rotatably mounted shaft containing a first conduit affixed in the lower section thereof and rotatable therewith and a second and a third conduit rigidly formed in the upper section thereof and rotatable therewith; crystal collector means comprising a plurality of conduits closed at their outer ends and radially extending from a central chamber rigidly affixed to and closed on said shaft, communicating at its central chamber with said second conduit; a plurality of crystal slurry distributing tubes extending from said first conduit outwardly into an intermediate portion of each said conduit of said crystal collector means; heating means, affixed to the outer end of each said crystal collector conduit; a liquid product conduit extending between the outer portion of each said crystal collector conduit and said third conduit; and means to rotate said shaft.

8. The crystal purifier of claim 7 wherein each said crystal collector conduit is provided with means for retaining crystals therein.

References Cited in the file of this patent

UNITED STATES PATENTS

| Number | Name | Date |
|---|---|---|
| 1,782,028 | Burch | Nov. 18, 1930 |
| 2,177,082 | Staaf | Oct. 24, 1939 |
| 2,185,279 | Strezysnki | Jan. 2, 1940 |
| 2,394,016 | Schutte et al. | Feb. 5, 1946 |
| 2,403,089 | Lars | July 2, 1946 |
| 2,422,882 | Bramley | June 24, 1947 |
| 2,534,210 | Schutte et al. | Dec. 12, 1950 |
| 2,614,134 | Powers | Oct. 14, 1952 |